(12) United States Patent
Melanson et al.

(10) Patent No.: US 7,826,578 B1
(45) Date of Patent: Nov. 2, 2010

(54) CIRCUITS AND METHODS FOR NOISE MANAGEMENT IN SYSTEMS INCLUDING AN ASYNCHRONOUSLY-OPERABLE DATA PORT

(75) Inventors: John Laurence Melanson, Austin, TX (US); Lingli Zhang, Austin, TX (US); Chang Yong Kang, Austin, TX (US); Johann Guy Gaboriau, Austin, TX (US)

(73) Assignee: Cirrus Logic, Inc., Austin, TX (US)

( * ) Notice: Subject to any disclaimer, the term of this patent is extended or adjusted under 35 U.S.C. 154(b) by 996 days.

(21) Appl. No.: 11/088,955

(22) Filed: Mar. 24, 2005

(51) Int. Cl.
*H04L 7/00* (2006.01)
*H03K 9/00* (2006.01)
*H04L 12/43* (2006.01)
*H04J 3/12* (2006.01)

(52) U.S. Cl. .................. 375/354; 375/316; 370/458; 370/522

(58) Field of Classification Search ............. 375/355, 375/354, 316; 370/458, 522
See application file for complete search history.

(56) References Cited

U.S. PATENT DOCUMENTS

| | | | | |
|---|---|---|---|---|
| 4,417,283 A | * | 11/1983 | Hoshimi et al. | 386/104 |
| 5,239,543 A | * | 8/1993 | Janssens | 370/458 |
| 5,436,943 A | * | 7/1995 | Borgen | 375/371 |
| 5,577,044 A | * | 11/1996 | Oxford | 370/522 |
| 5,654,657 A | * | 8/1997 | Pearce | 327/163 |
| 5,774,623 A | * | 6/1998 | Maeda et al. | 386/98 |
| 5,892,694 A | * | 4/1999 | Ott | 708/313 |
| 6,628,999 B1 | * | 9/2003 | Klaas et al. | 700/94 |
| 6,657,574 B1 | * | 12/2003 | Rhode | 341/155 |
| 2001/0033583 A1 | * | 10/2001 | Rabenko et al. | 370/503 |
| 2003/0026368 A1 | * | 2/2003 | Subramoniam et al. | 375/354 |
| 2003/0179116 A1 | * | 9/2003 | Oki | 341/61 |
| 2004/0213350 A1 | * | 10/2004 | Frith et al. | 375/242 |
| 2004/0233997 A1 | * | 11/2004 | Umesako | 375/240.26 |

FOREIGN PATENT DOCUMENTS

WO    WO9940683    *  8/1999

OTHER PUBLICATIONS

A differential digital to analog converter using a CMOS digital PWM Ramalho, E.; Dias, J.A.S.; Microelectronics, 2000. Proceedings. 2000 22nd International Conference on vol. 2, May 14-17, 2000 pp. 699-702 vol. 2.*

* cited by examiner

*Primary Examiner*—Mohammad H Ghayour
*Assistant Examiner*—Sarah Hassan
(74) *Attorney, Agent, or Firm*—Thompson & Knight LLP; James J. Murphy

(57) ABSTRACT

A data processing system including an input data port for receiving input data samples asynchronous to a native clock signal and having an input sample rate, a first sample rate converter for converting the data samples from the input sample rate to a sample rate synchronous with a rate of the native clock signal, and a data converter for converting data samples output from the first sample rate converter to another format. An analog to digital converter converts an analog signal into output data samples with a sample rate synchronous with the rate of the native clock signal, and a second sample rate converter converts the sample rate of the output data samples from the sample rate synchronous with the rate of the native clock signal to an output sample rate such that output data samples are asynchronous to the native clock signal.

17 Claims, 6 Drawing Sheets

CIRCUITS AND METHODS FOR NOISE MANAGEMENT IN SYSTEMS INCLUDING AN ASYNCHRONOUSLY-OPERABLE DATA PORT

FIELD OF INVENTION

The present invention relates in general to mixed signal data processing techniques, and in particular, to circuits and methods for noise management in systems including an asynchronously-operable data port.

BACKGROUND OF INVENTION

The manufacturers of state of the art audio and video systems are increasingly demanding multiple-format integrated circuits which include a combination of analog to digital converters (ADCs), digital to analog converters (DACs), and/or pulse width modulation (PWM) controllers fabricated together on a single chip. The design of such multiple-format integrated circuits presents a number of significant challenges to the chip design, particularly in regards to the management of on-chip noise.

Most audio and video system applications require compatible data ports for exchanging digital data between devices and subsystems. For example, a typical audio serial data port includes a serial data (SDATA) pin for inputting a serial audio data (SDATA) bitstream, in the case of a DAC or PWM controller, or for outputting an SDATA, bitstream, in the case of an ADC. Typically, each bit of the SDATA bitstream is clocked in or out of the SDATA pin in response to an associated serial clock (SCLK) signal. A sampling clock, having a frequency corresponding to the digital sample rate, partitions the SDATA bit stream into samples of one or more serial bits each. In the specific example of a stereo audio system, the sampling clock is a left-right clock (LRCK) signal, which time-multiplexes samples of left- and right-channel audio data into the SDATA bitstream.

A typical audio serial data port operates in either a master mode or a slave mode. In the master mode, the SCLK and LRCK clock signals are generated internally, in response to a received master clock (MCLK) signal, and output to the destination of the SDATA bitstream, in the case of an ADC. In the slave mode, the SCLK and LRCK clock signals are received from the source or destination of the SDATA bitstream. The MCLK signal in the slave mode is either received from external circuitry synchronized with the LRCK signal or recovered by an on-chip phase-locked loop (PLL) from the LRCK signal.

Advantageously, the utilization of serial ports minimizes the number of pins and associated on-chip driver circuitry. Given the increasing demand for multiple-format integrated circuits, as well as the overall goal of achieving high on-chip noise performance, new noise management techniques are required for utilization in integrated circuits including one or more data ports that can operate in an asynchronous mode.

SUMMARY OF INVENTION

The principles of the present invention are embodied in circuits, systems and methods which improve noise management in multiple-format devices and systems. One representative embodiment of these principles is a data processing system including an input data port for receiving input data samples asynchronous to a native clock signal and having an input sample rate, a first sample rate converter for converting the data samples from the input sample rate to a sample rate synchronous with a rate of the native clock signal, and a data converter for converting data samples output from the first sample rate converter to another format. An analog to digital converter converts an analog signal into output data samples with a sample rate synchronous with the rate of the native clock signal, and a second sample rate converter converts the sample rate of the output data samples from the sample rate synchronous with the rate of the native clock signal to an output sample rate such that output data samples are asynchronous to the native clock signal.

Embodiments of the present principles advantageously allow for efficient noise management in devices and systems including one for more serial data ports. These principles are particularly suitable when integrating one or more multiple-format data paths, such as ADCs, DACs, and/or PWM encoders, on to a single integrated circuit, which interfaces with other devices and systems through an asynchronous serial port. Specifically, by synchronizing all data streams in a single clock signal domain, on-chip switching events may be appropriately spaced in time to avoid noise coupling between on-chip circuits.

BRIEF DESCRIPTION OF DRAWINGS

For a more complete understanding of the present invention, and the advantages thereof, reference is now made to the following descriptions taken in conjunction with the accompanying drawings, in which.

DETAILED DESCRIPTION OF THE INVENTION

The principles of the present invention and their advantages are best understood by referring to the illustrated embodiment depicted in FIGS. 1-4 of the drawings, in which like numbers designate like parts.

Figure 1:
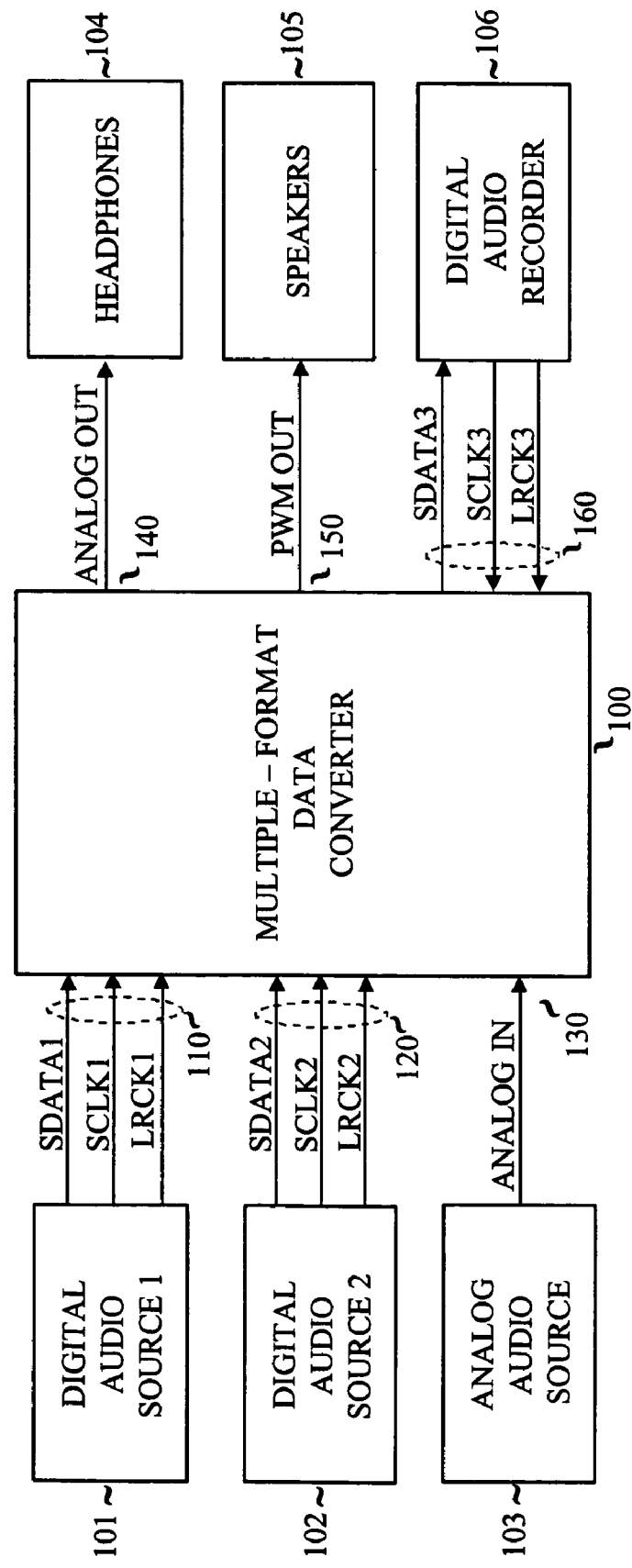
FIG. 1 is a high level block diagram of an exemplary multiple-format data converter suitable for describing one application of the principles of the present invention.

FIG. 1 is a high level block diagram of an exemplary single-chip multiple-format data converter 100 embodying the principles of the present invention. In the illustrated embodiment, multiple-format data converter 100 includes a digital to analog converter (DAC) path, pulse width modulated (PWM) encoding path, and an analog to digital converter (ADC) path, each of which will be described in detail below.

Multiple-format data converter 100 includes two audio input serial ports 110 and 120 for independently receiving digital audio data from two digital audio sources 101 and 102. In particular, digital audio source 101 provides a serial audio data bitstream SDATA1, which is transmitted bit-serial in response to a serial clock (bit-clock) signal SCLK1. Samples of left- and right-channel stereo data, each sample represented by one or more bits of the SDATA1 bitstream, are timed by a left-right (sampling) clock signal LRCK1. Similarly, digital audio source 102 provides a second serial audio data bitstream SDATA2 in response to serial clock (bit-clock) signal SCLK2. Samples of left- and right-channel stereo audio data in second serial bitstream SDATA2 are timed by left-right (sampling) clock signal LRCK2. Digital audio sources 101 and 102 each may be any one of a number of possible digital audio devices, such as digital television/radio tuners, compact disk (CD) players, Moving Pictures Expert Group (MPEG) decoders, and the like.

In the illustrated embodiment, multiple-format data converter 100 is operating in a slave mode, in which serial clock signals SDATA1 and SDATA2 and left-right clock signals LRCK1 and LRCK2 are received from digital audio sources 101 and 102, although the present inventive principles are not limited thereto.

Analog input port 130 of multiple-format data converter 100 supports a connection to an analog audio source 103, such as a sound decoder, a radio or television analog output, a digital versatile disk (DVD) player analog output, or similar analog audio source. Analog output port 140 allows multiple-format data converter 100 to drive a set of headphones 104. A PWM output port 150 supports a connection to a set of speakers 105, or other external circuit or device operating on PWM encoded data.

Multiple-format data converter 100 also includes a digital serial output port 160 for connection to a digital audio device, such as a digital audio decoder 106 or the like. In the illustrated embodiment, digital output port 160 operates in the slave mode and outputs a serial audio data bitstream SDATA3 in response to a received serial clock signal SCLK3. Samples of left- and right-channel stereo audio output data are timed by a received left-right clock signal LRCK3.

Figure 2:
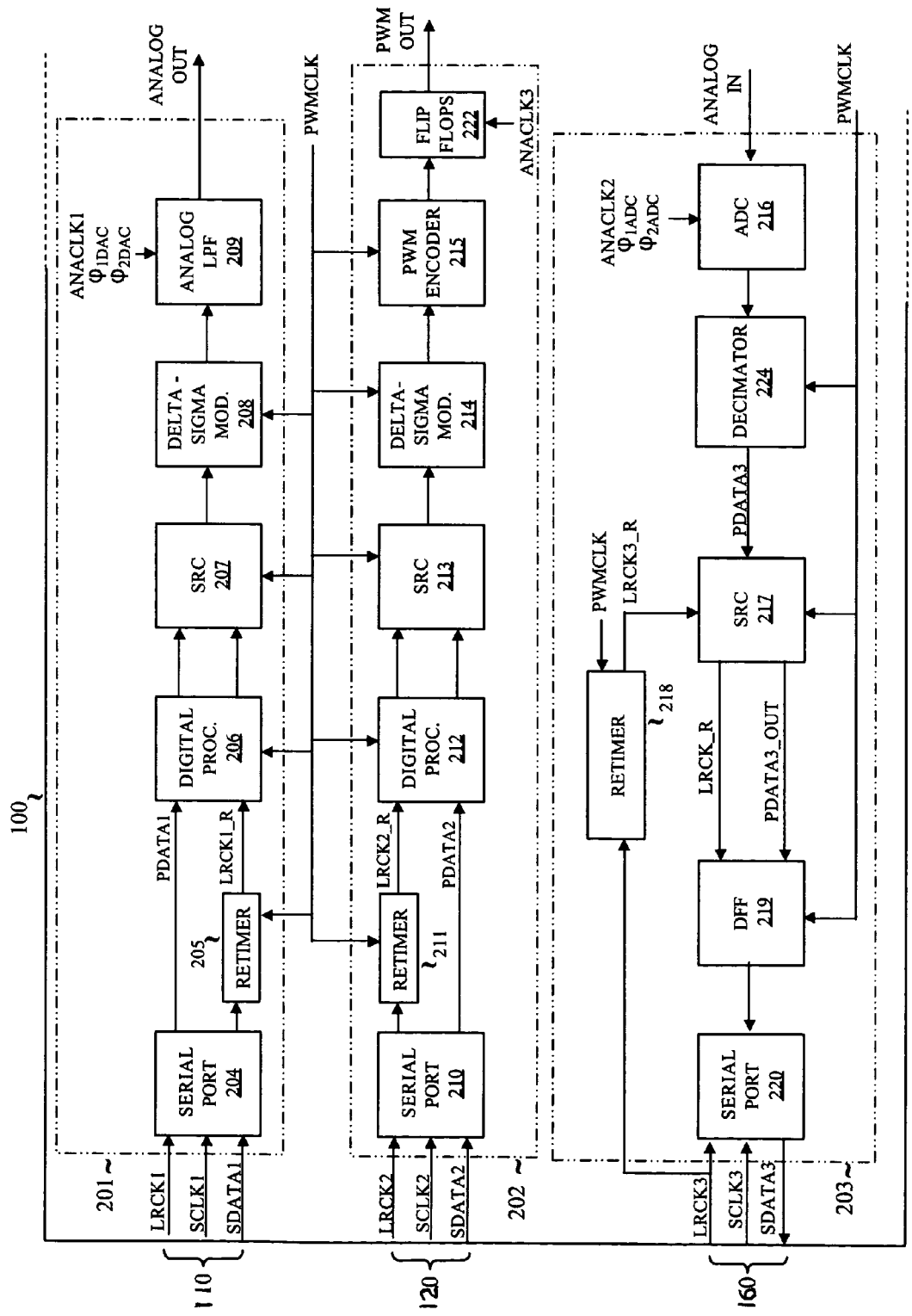
FIG. 2 is a more detailed block diagram of a representative embodiment of the multiple-format data converter shown in FIG. 1.

FIG. 2 is a more detailed block diagram of multiple-format data converter 100, showing DAC path 201, PWM encoding path 202, and ADC path 203, in further detail. In alternate embodiments, the number, type, and combination of processing paths may vary, depending on the expected application of multiple-format data converter 100.

Any external devices or systems exchanging data through serial digital data ports 110, 120, and 160 in the slave mode operate asynchronously with data processing paths 201-203. Such asynchronous input and output of data through serial digital data ports 110, 120 and 160 would normally make the problem of managing noise coupling between data processing paths 201-203 a significant challenge, particularly when each individual data path is running synchronously to its own local LRCK. For example, depending on the timing of the signals controlling the various switching events, noise generated by the switching circuitry within DAC path 201 can couple through the substrate or power supply lines into the output of PWM path 202, or sampled into the input of ADC path 203. Similarly, switching noise generated in PWM path 202 can couple into DAC path 201, depending on the timing of the various switching events.

According to the principles of the present invention, a unified clock domain is utilized for most of the digital and analog signal processing. Specifically, the operations of DAC path 201, PWM data path 202, and ADC path 203 are timed by digital and analog clock signals generated by a single time base controlled by noise management circuitry 300 shown in FIG. 3, and discussed further below. Generally, noise management circuitry 300 generates the internal analog and digital clock signals shown in the timing diagram of FIG. 4C by retiming an externally generated (un-retimed) PWM clock signal PWMCLK_URET. Advantageously, the PWMCLK_URET is normally a high frequency signal generated with minimal noise. By offsetting the edges of the analog and digital clock signals in time base set by the WMCLK_URET signal, clock management circuitry 300 ensures that sensitive analog operations, such as analog signal sampling, do not occur closely in time with digital switching operations. In alternate embodiments, any other clock suitable for generating a common time base, such as an audio master clock (MCLK) signal, may be used.

Figure 4A:
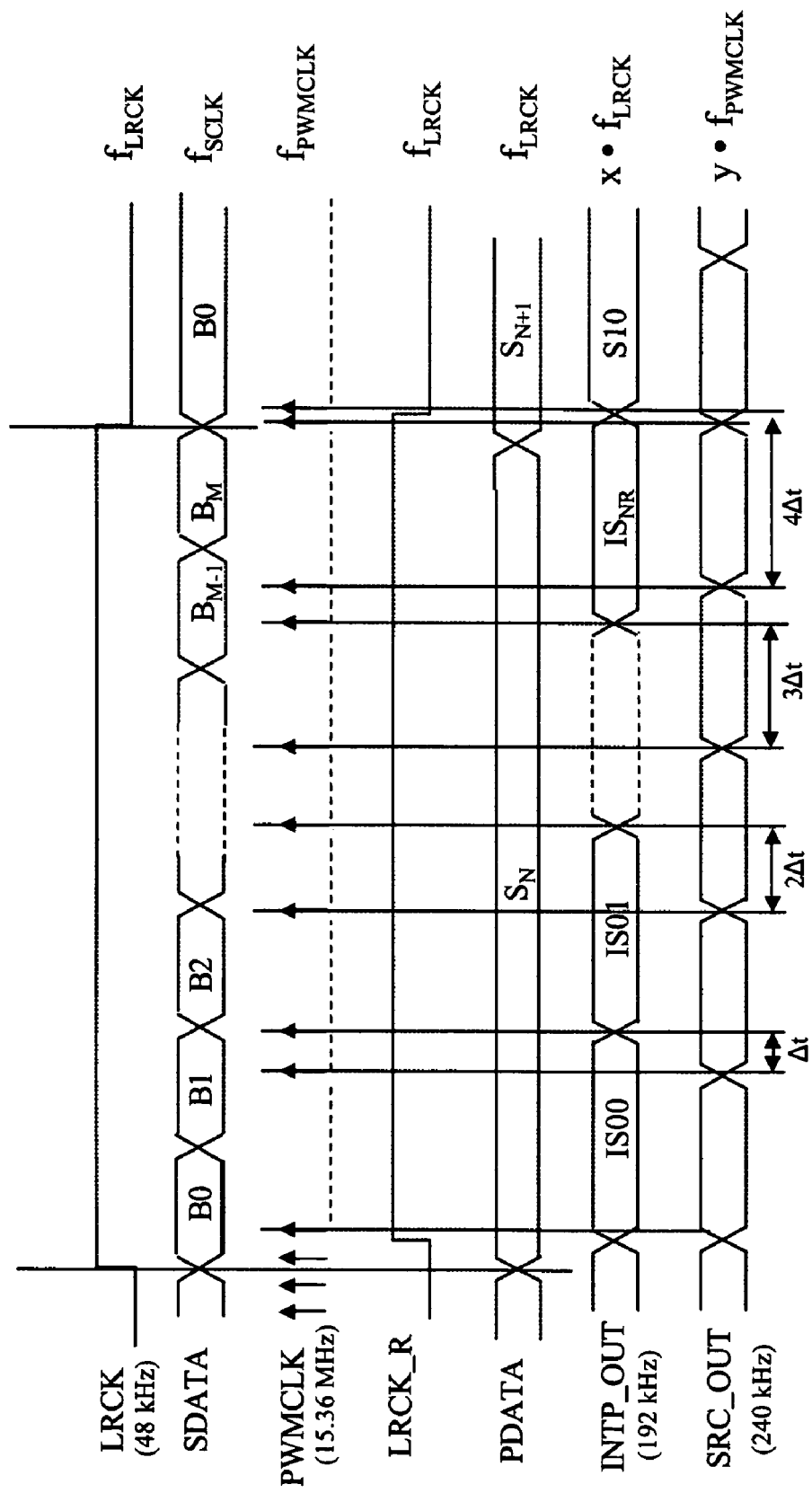
FIG. 4A is a timing diagram illustrating typical timing relationships between signals during the operations of the digital to analog converter (DAC) and/or pulse width modulation (PWM) encoding data processing paths shown in FIG. 2.

The operation of DAC path 201 is generally illustrated by the timing diagram of FIG. 4A, in conjunction with the block diagram of FIG. 2. DAC path 201 includes serial port control circuitry 204, which inputs the bits of SDATA1 bitstream timed by the SCLK1 signal. The serial data bits $B0-B_M$ falling between each rising and each falling edge of the LRCK1 signal constitute one audio sample, and are converted to corresponding samples $S_N$ of parallel data PDATA1 at the frequency of the LRCK1 signal ($f_{LRCK}$). In the example shown in FIG. 4A, the frequency fLRCK is 48 kHz.

Figure 3:
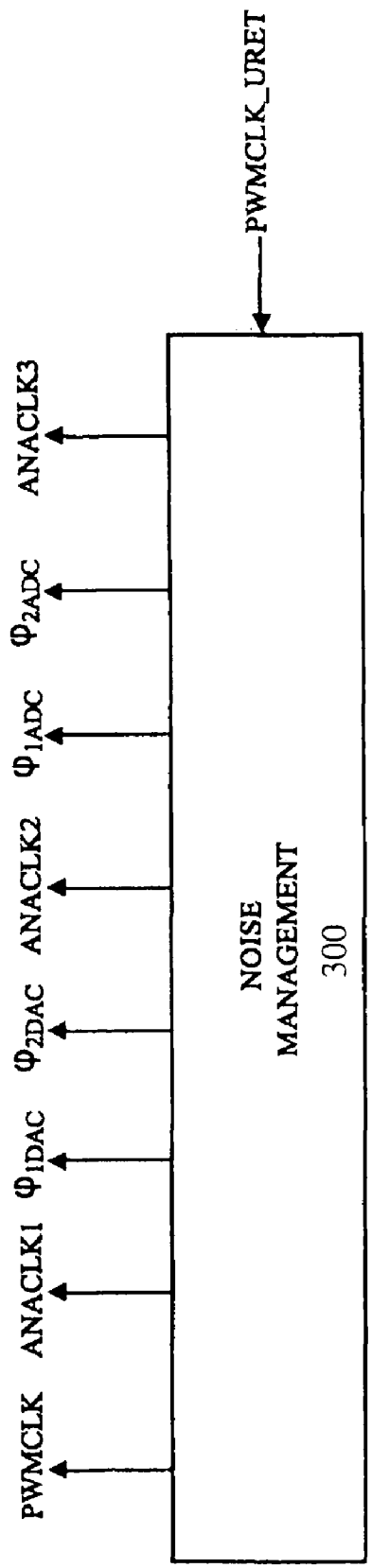
FIG. 3 is a block diagram of representative noise management circuitry suitable for utilization in the multiple-format data converter shown in FIG. 2.

The received LRCK1 signal is retimed by retiming block 205 to generate a retimed signal LRCK1_R, having edges synchronized to corresponding edges of the retimed PWMCLK signal generated by noise management circuitry 300 of FIG. 3, and has a much higher frequency than the LRCK1_R signal. Retimer block 205 is, for example, a simple pair of flip-flops pipelining the received LRCK signal clocked by the PWMCLK signal. In FIG. 4A, the PWMCLK signal has a frequency of 15.36 MHz.

Parallel data samples $S_N$ of the PDATA1 stream and the LRCK1_R signal are input to digital processing block 206 of FIG. 2, which operates synchronously from the PWMCLK signal. The rising and falling edges of the retimed LRCK1_R signal now define each audio sample $S_N$ of parallel data PDATA1 at the frequency $f_{LRCK}$. Digital processing block 206, is for example, an interpolator, volume control circuitry, audio effects processor, or similar audio processing circuitry. The timing diagram of FIG. 4A illustrates an example where digital processing block 206 is an interpolator. In the case of an interpolator, each parallel-data audio sample $S_N$ is up-sampled x-number of times with the PWMCLK signal to generate an interpolated parallel data stream INTP_OUT at a sampling rate of $x \cdot f_{LRCK}$, which in the example of FIG. 4A is 192 kHz.

At the output of digital processing block 206, the base sampling rate is still derived from the sampling clock rate $f_{LRCK}$; therefore sample rate conversion is performed in sample rate conversion (SRC) block 207 to convert the data sampling rate to the clock PWMCLK domain. SRC block 207 generates an output data stream with a sample rate $y \cdot fPWMCLK$, in which y is a selected integer or non-integer conversion factor. In the exemplary timing diagram of FIG. 4A, the output stream of SRC_OUT SRC block 207 has a sample rate 240 kHz and has a phase Δt, relative to the data stream INTP_OUT.

A delta-sigma modulator 208, performs noise shaping and digital to analog conversion on the data stream output from SRC block 207. Delta-sigma modulator 208 performs noise shaping utilizing PWMCLK signal for oversampling. Analog LPF 209 converts the resulting quantized data stream into analog data in response to the analog clock signals ANACLK1, $\phi_{1DAC}$, and $\phi_{2DAC}$. As shown in the timing diagram of FIG. 4C, the edges of the ANACLK1, $\phi_{1DAC}$, and $\phi_{2DAC}$ signals, which control switched-capacitor circuitry with analog LPF 209, are temporally spaced from the edges of the PWMCLK signal, to avoid the sampling of digital noise in the substrate and/or the power supply lines during digital to analog conversion. The resulting analog data ANALOG_OUT are sent to output drivers (not shown) to transmission off chip.

As shown in FIG. 2, PWM encoding path 202 is generally similar in structure to DAC path 202 except LPF 209. Operation of PWM encoding path 202 may also be described using the exemplary timing diagram if FIG. 4A.

PWM encoding path 202 includes a serial port control circuit 210, which receives a serial bitstream SDATA2, with bits clocked by serial clock signal SCLK2 and samples timed by sampling (left-right) clock signal LRCK2. Serial port control circuit 210 outputs parallel data PDATA2, along with the LRCK2 signal. Retimer circuitry 211 synchronizes the edges of the LRCK2 clock signal with the PWMCLK signal to generate a retimed sampling clock signal LRCK2_R.

Similar to DAC path 201, PWM encoding path 202 includes a digital processing block 212, such as an interpolator, volume control circuitry, audio effects processor, which operates on the samples of parallel data PDATA2, defined by the retimed sampling clock signal LRCK2_R, in response to the PWMCLK signal. An SRC block 213 converts the parallel sample stream PDATA2 from the clock domain LRCK2_R to the PWMCLK clock domain. Delta-sigma modulator 214, utilizing the PWMCLK signal for oversampling, performs noise shaping on the data stream prior to encoding into a PWM encoded stream by PWM encoder block 215. On-chip driver circuitry (not shown) provides the ultimate PWM output signal from multiple-format data converter 100. The PWM output signal is typically extremely sensitive to clock edges and therefore the analog clock signal ANACLK3 shown in FIG. 4C is used to latch the final PWM output pulse in a set of flip-flops 222.

As discussed above, ADC path 203 provides a stream of serial digital data to an external device operating asynchronously with multiple-format data converter 100. Specifically, ADC provides for the conversion of an analog data stream at analog port 130 of FIG. 1 into a stream of serial output data SDATA3 at serial output port 160. In the slave mode, bits of the serial data stream SDATA3 are clocked by an externally generated serial clock signal SCLK3 and samples defined by an externally generated sampling (left-right) clock signal LRCK3.

Figure 4B:
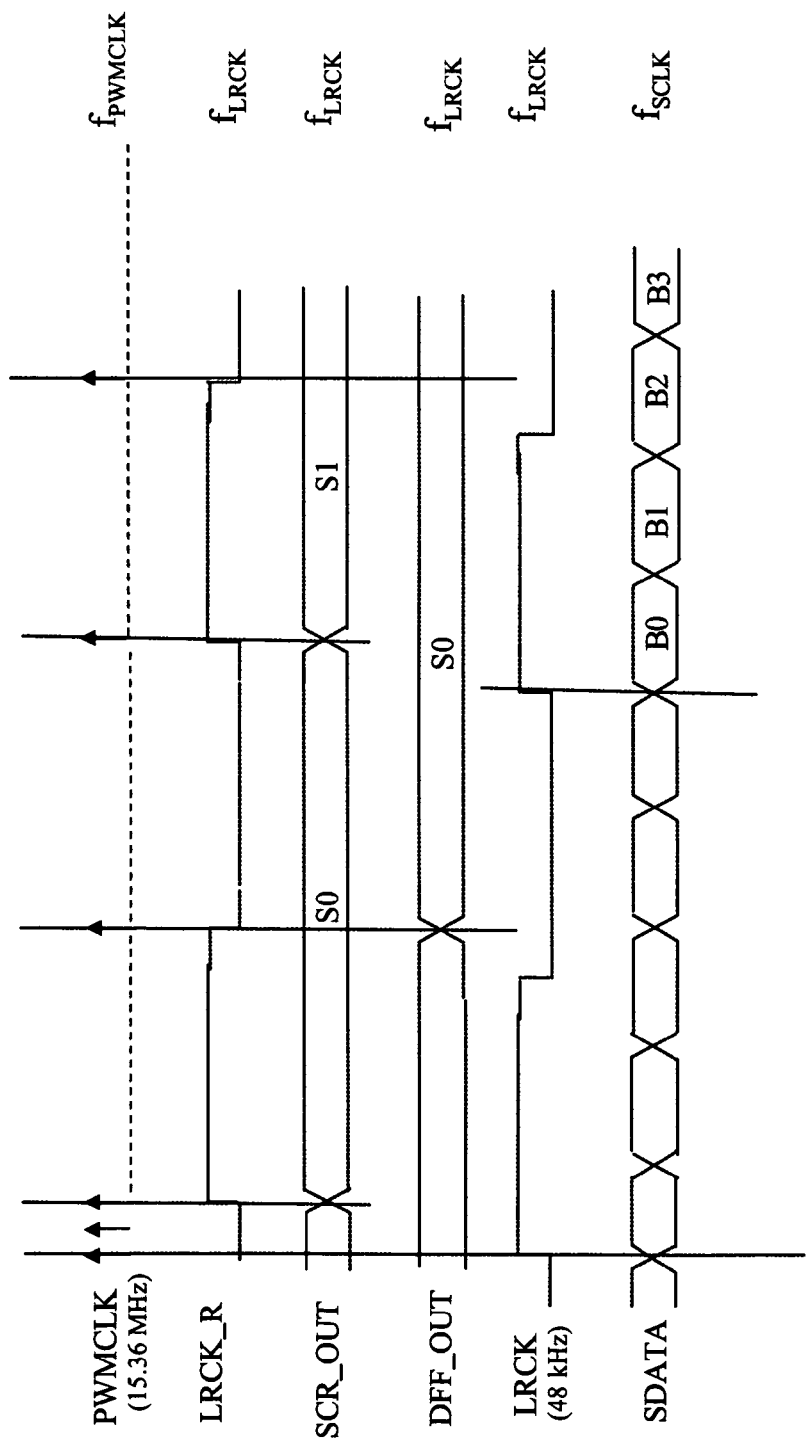
FIG. 4B is a timing diagram illustrating typical timing relationships between signals during operations of the analog to digital converter (ADC) data path shown in FIG. 2.
Figure 4C:
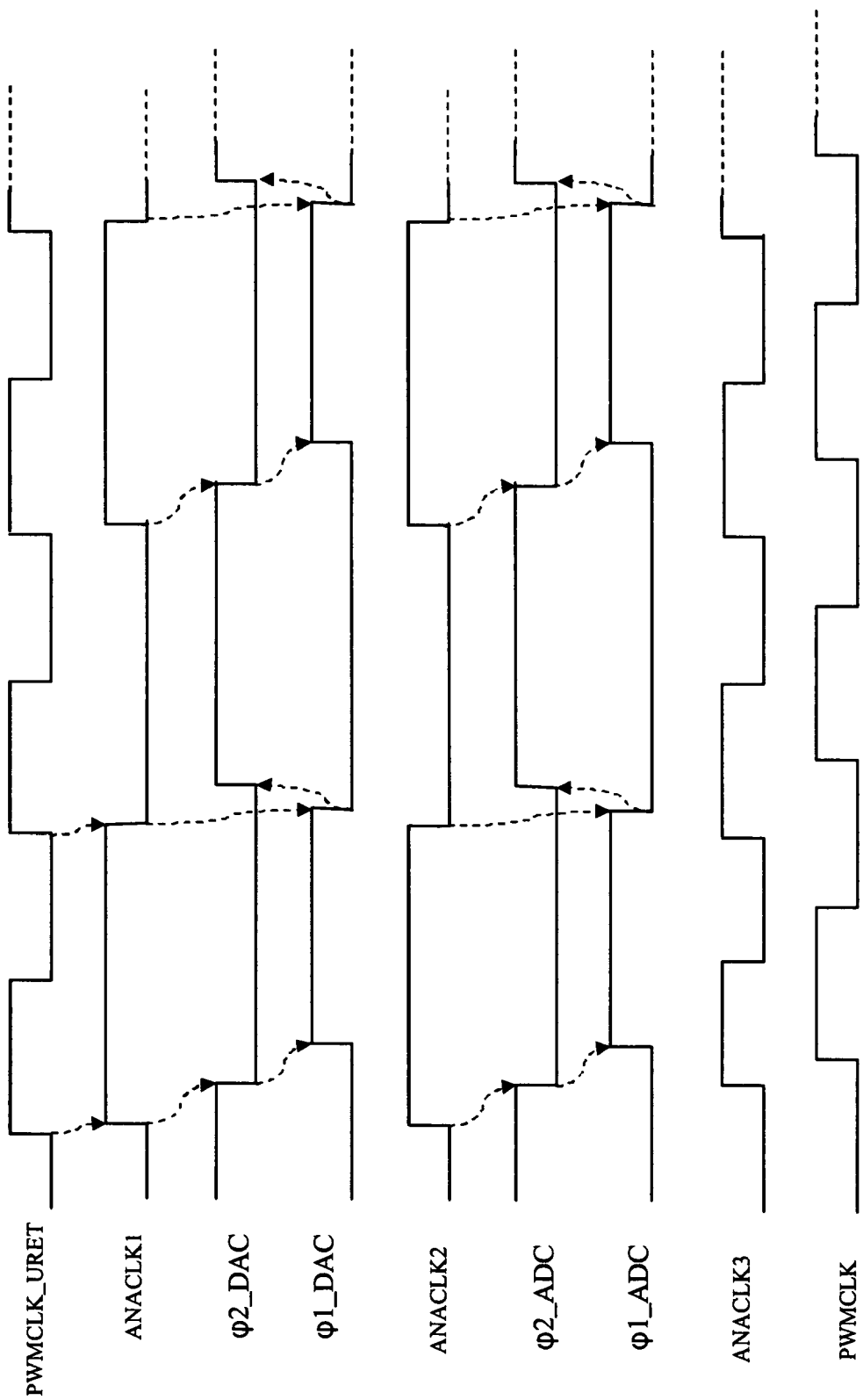
FIG. 4C is a timing diagram illustrating typical timing relationships between the signals during operations of the noise management circuitry of FIG. 3.

The operational blocks of ADC path 202 shown in FIG. 2 are best described in conjunction with the timing diagrams of FIGS. 4B and 4C. In particular, ADC block 216 first converts the analog input stream ANALOG_IN into a stream of parallel digital data PDATA3 utilizing the analog clock signals ANACLK2, $\phi_{1ADC}$, and $\phi_{2ADC}$. To avoid sampling of on-chip digital noise, the edges of analog clock signals ANACLK2, $\phi_{1DAC}$, and $\phi_{2DAC}$, which control the switched-capacitor circuitry within ADC block 216, are offset in time from the PWMCLK signal controlling all on-chip digital operations, as shown in FIG. 4C.

The samples output from ADC block 216 are down-sampled in decimator 224, which outputs as stream of parallel data samples PDATA3. The PDATA3 stream is in the PWMCLK clock domain; therefore, an SRC 217, also operating in the PWMCLK clock domain, converts the parallel data samples of PDATA3 stream into the LRCK3 clock domain. Specifically, a retimer block 218 synchronizes the edges of the externally generated sampling clock signal LRCK3 to the PWMCLK clock signal to generate a retimed sampling clock signal LRCK3_R. SRC 217 then converts the PDATA3 stream into parallel data samples PDATA3_OUT timed by the retimed sampling clock signal LRCK3_R.

The retimed parallel samples PDATA3_OUT are latched by D flip-flops (DFF) 219 on the falling edges of the retimed sampling signal LRCK3_R. On the subsequent rising edges of the externally generated sampling clock LRCK3, the latched samples are output from serial port circuitry 220 of multiple-format data converter 100, with bits transferred in response to the associated externally generated serial clock SCLK3.

In multiple-format data converter 100, the only circuit blocks which are not operating in the PWMCLK clock domain are the serial port circuit blocks 204, 210, and 220. Since the remaining circuits blocks of DAC path 201, PWM encoding path 202, and ADC path 203 are also synchronized with the PWMCLK clock signal, the problem of noise management is substantially simplified. Specifically, switching events in the various circuit blocks within DAC path 201, PWM encoding path 202, and ADC path 203 may now be timed such to minimize inter-circuit noise coupling. In the illustrated embodiment, noise management circuitry 221 times the various switching events in the PWMCLK clock domain such that noise from the substrate, the power supply rails, and/or other potential on-chip noise sources has minimal effect on any noise sensitive circuits on-chip. These noise sensitive circuits include, for example, the output circuitry of PWM encoder 215, modulator DAC 208, analog LPF 209, and any nodes controlled by the PWMCLK clock signal or signals derived from the PWMCLK clock signal.

The principles of the present invention are not limited to integrated circuit devices and systems which include multiple data paths. For example, any one of DAC path 201, PWM encoder path 202, or ADC path 203, standing alone can benefit from the application of these principles, particularly when operating in a slave mode. For example, in ADC path 203, by synchronizing the externally generated LRCK3 signal with an internal clock signal, for example the PWMCLK signal in the embodiment of FIG. 2, noise sensitive operations, such as the sampling of audio data, may be timed to avoid noise generating transitions at the serial port 160 SDATA output.

Although the invention has been described with reference to specific embodiments, these descriptions are not meant to be construed in a limiting sense. Various modifications of the disclosed embodiments, as well as alternative embodiments of the invention, will become apparent to persons skilled in the art upon reference to the description of the invention. It should be appreciated by those skilled in the art that the conception and the specific embodiment disclosed might be readily utilized as a basis for modifying or designing other structures for carrying out the same purposes of the present invention. It should also be realized by those skilled in the art that such equivalent constructions do not depart from the spirit and scope of the invention as set forth in the appended claims.

It is therefore contemplated that the claims will cover any such modifications or embodiments that fall within the true scope of the invention.

What is claimed is:

1. A data processing system comprising:
   an input data port for receiving input data samples asynchronous to a native clock signal and having an input sample rate controlled by a first received sampling clock signal;
   first retiming circuitry for synchronizing the first received sampling clock signal with the native clock signal to generate a first synchronized sampling clock signal;
   a first sample rate converter for converting the input data samples from the input sample rate to another sample rate synchronous with a rate of the native clock signal, wherein the input data samples are clocked into the first sample rate converter by the first synchronized sampling clock signal and the another sample rate is selectively increased and decreased relative to the input sample rate sample rate by a selected one of integer and fractional multiples of the rate of the native clock signal;

a data converter for converting data samples output from the first sample rate converter to another format;

an analog to digital converter for converting an analog signal into output data samples with a sample rate synchronous with the rate of the native clock signal;

second retiming circuitry for synchronizing a second sampling clock signal with the native clock signal to generate a second synchronized sampling clock signal;

a second sample rate converter for converting the sample rate of the output data samples from the sample rate synchronous with the rate of the native clock signal to an output sample rate, wherein the output data samples are clocked out of the second sample rate converter by the second synchronized sampling clock signal and the output sample rate is selectively increased and decreased relative to the sample rate by a selected one of integer or fractional multiples of the rate of the second synchronized sampling clock signal; and an output port for outputting the output data samples in response to the second received sampling clock signal such that output data samples are asynchronous to the native clock signal.

2. The data processing system of claim 1, wherein the data converter and the analog to digital data converter operate respectively in response to digital and analog clock signals synchronous with the native clock signal, further comprising:

noise management circuitry for generating the digital and analog clock signals synchronous with the native clock signal to time operations of the data converter and the analog to digital converter to minimize digital operations performed by the data converter proximate in time to analog sampling operations performed by the analog to digital converter.

3. The data processing system of claim 1, wherein the input samples are received through the input port in response to the first received sampling clock signal, and wherein the first retiming circuitry comprises:

a flip-flop circuit for synchronizing the first received sampling clock signal to the native clock signal to generate the first synchronized sampling clock signal for clocking the input samples into the first sample rate converter.

4. The data processing system of claim 1, wherein the second retiming circuitry comprising:

a flip-flop circuit for synchronizing the second received sampling clock to the native clock signal to generate the second synchronized sampling clock signal for clocking the output samples output from the second sample rate converter.

5. The data processing system of claim 1, wherein the first received sampling clock signal and the second received sampling clock signal comprise audio left-right clock signals.

6. The data processing circuitry of claim 1, wherein the data converter comprises a digital to analog converter.

7. The data processing circuitry of claim 1, wherein the data converter comprises a pulse width modulation encoder.

8. The data processing circuitry of claim 3, further comprising digital processing circuitry operating on the input samples, the input samples clocked to an input of the digital processing circuitry in response to the first synchronized sampling clock signal.

9. A method of managing noise in a system having multiple data converters comprising:

receiving input data samples asynchronous to a native clock signal and at an input sample rate;

synchronizing a received sampling clock signal timing the input samples with the native clock signal to generate a synchronized sampling clock signal;

converting the input data samples from the input sample rate to another sample rate synchronous with a rate of the native clock signal with a sample rate converter, wherein the input samples are clocked into the sample rate converter with the synchronized sampling clock signal and the another sample rate is selectively increased and decreased relative to the input sample rate by a selected one of integer or fractional multiples of the rate of the native clock signal;

converting the data samples output from the sample rate converter at the sample rate synchronous with the rate of the native clock signal to another format;

converting an analog signal into output data samples with a sample rate synchronous with a rate of the native clock signal;

synchronizing another sampling clock signal with the native clock signal to generate another synchronized sampling clock signal;

converting the sample rate of the output data samples with another sample rate converter from the sample rate synchronous with the rate of the native clock signal to an output sample rate, wherein the output samples are clocked out of the another sample rate converter with the another synchronized sampling clock signal and the output sample rate is selectively increased and decreased relative to the sample rate by a selected one of integer or fractional multiples of the rate of the another synchronized sampling clock signal; and outputting the output data samples in response to the another received sampling clock signal such that output data samples are asynchronous to the native clock signal.

10. The method of claim 9, wherein converting the input samples to another format comprises performing digital to analog conversion.

11. The method of claim 9, wherein converting the input samples to another format comprises performing pulse width modulation.

12. The method of claim 9, wherein converting the input data samples and converting the analog signal are respectively performed in response to digital and analog clock signals synchronous with the native clock signal, further comprising:

generating the digital and analog clock signals from the native clock signal for time conversion of the input data samples and for conversion of the analog signal to digital samples to minimize digital operations proximate in time to analog sampling operations.

13. The method of claim 11, wherein performing pulse width modulation encoding comprises generating a pulse width modulated data stream in response to a pulse width modulation clock signal, and the native clock signal comprises the pulse width modulation clock signal.

14. Data processing circuitry comprising:

a plurality of interfaces for asynchronously exchanging streams of data samples with other data processing circuitry in response to at least one received sampling clock signal within an external time base controlled by an external clock signal;

retiming circuitry for synchronizing the at least one received sampling clock signal with an internal clock signal to generate at least one synchronized sampling clock signal;

sample rate conversion circuitry for converting the plurality of streams of data samples between the external time base and an internal time base controlled by an internal clock signal and including a sample rate converter outputting a stream of data samples in response to the at least one synchronized sampling clock signal, the sample rate converter selective increasing and decreasing a sample rate of the stream of data samples by a selected one of integer or fractional multiples of a rate of the at least one synchronized sampling clock signal, and another sample rate converter inputting another stream of data samples in response to the at least one synchronized sampling clock signal, the another sample rate converter selectively increasing and decreasing a sample rate of the another stream of data samples by a selected one of integer or fractional multiples of a rate of the at least one synchronized sampling clock signal;

data processing circuitry operating on the data streams within the internal time domain.

15. The data processing circuitry of claim 14, wherein the data processing circuitry comprises a data converter selected from the group consisting of analog to digital converters, digital to analog converters, and pulse width modulation encoders.

16. The data processing circuitry of claim 14, wherein the plurality of interfaces includes at least one serial input port and at least one serial output port.

17. The data processing circuitry of claim 14, wherein the data processing circuitry comprises a plurality of data processing paths formed on a single integrated circuit chip.

* * * * *